United States Patent [19]

Fletcher

[11] 4,167,033

[45] Sep. 4, 1979

[54] LUMINAIRE MOUNTING DEVICE

[75] Inventor: Thomas A. Fletcher, Dana, N.C.

[73] Assignee: General Electric Company, Schenectady, N.Y.

[21] Appl. No.: 840,069

[22] Filed: Oct. 6, 1977

[51] Int. Cl.$^2$ .......................... F21S 1/10; F21V 21/10; F21V 21/14; F16M 13/02

[52] U.S. Cl. .................................... 362/396; 248/230; 248/291; 362/270; 362/285; 362/368; 362/418; 362/431

[58] Field of Search ............... 362/391, 396, 431, 270, 362/285, 368, 418; 248/230, 291

[56] References Cited

U.S. PATENT DOCUMENTS

| | | | |
|---|---|---|---|
| 1,152,530 | 9/1915 | Madden | 362/396 |
| 1,178,594 | 4/1916 | Nixon | 362/427 |
| 1,296,060 | 3/1919 | Ferguson | 362/431 |
| 1,621,645 | 3/1927 | Thorp | 362/396 |
| 1,843,454 | 2/1932 | Manson | 362/418 |
| 2,489,076 | 11/1949 | Bjontegard | 362/396 |
| 2,667,317 | 1/1954 | Trebules | 248/291 |
| 2,802,395 | 8/1957 | Madion | 248/291 |
| 2,846,570 | 8/1958 | Harling | 362/396 |
| 3,018,081 | 1/1962 | Waldbauer | 362/431 |
| 3,142,501 | 7/1969 | Clark et al. | 362/396 |
| 3,184,199 | 5/1965 | Clark et al. | 248/230 |
| 3,230,094 | 2/1966 | Foulds | 362/396 |
| 3,387,866 | 6/1968 | Baldwin | 248/230 |
| 3,652,047 | 3/1972 | Starr | 248/230 |

FOREIGN PATENT DOCUMENTS

| | | | |
|---|---|---|---|
| 134884 | 10/1933 | Austria | 362/431 |
| 1171080 | 5/1964 | Fed. Rep. of Germany | 362/431 |
| 2422695 | 7/1975 | Fed. Rep. of Germany | 362/431 |

*Primary Examiner*—Benjamin R. Padgett
*Assistant Examiner*—T. S. Gron
*Attorney, Agent, or Firm*—Sidney Greenberg

[57] ABSTRACT

Luminaire with adjustable mounting means for securing the luminaire to a supporting pipe. The mounting means comprises a slipfitter having a base plate on which a pair of spaced U-bolts are adjustably mounted for clamping engagement with the supporting pipe inserted therein, a pair of spaced L-shaped brace members secured to the plate on opposite sides of the slipfitter axis, and a pair of L-shaped bracket members secured to the luminaire, the bracket members being adjustably secured to the respective spaced brace members for adjustment about an axis normal to the slipfitter axis. The slipfitter arrangement provides for adjustment of the luminaire separately about the two axes.

9 Claims, 5 Drawing Figures

LUMINAIRE MOUNTING DEVICE

The present invention relates to luminaires, and more particularly concerns a luminaire with adjustable mounting device.

It is an object of the invention to provide an improved mounting device for luminaires which enables separate adjustment of the luminaire about two different axes.

It is another object of the invention to provide a luminaire mounting device of the above type which is of simple yet rugged construction, reliably secures the luminaire in adjusted position, and facilitates installation and servicing of the luminaire.

A particular object of the invention is to provide a luminaire mounting device which has a compact structure for positioning within limited space in the luminaire.

Other objects and advantages will become apparent from the following description and the appended claims.

With the above objects in view, the present invention in one of its aspects relates to a luminaire comprising, in combination, a support member, a pair of spaced bracket members secured to and projecting from the support member, a base member spaced from the support member, a pair of brace members secured to the base member and projecting therefrom toward the support member in juxtaposed relation respectively to the bracket members, and clamping means adjustably secured to the base member defining a passage between the brace members for receiving the elongated support along the axis of the passage and for clamping the same therein, said bracket members respectively being adjustably secured to the brace members for adjustment relative thereto about an axis transverse the first mentioned axis.

The invention will be better understood from the following description taken in conjunction with the accompanying drawings, in which.

Figure 1:
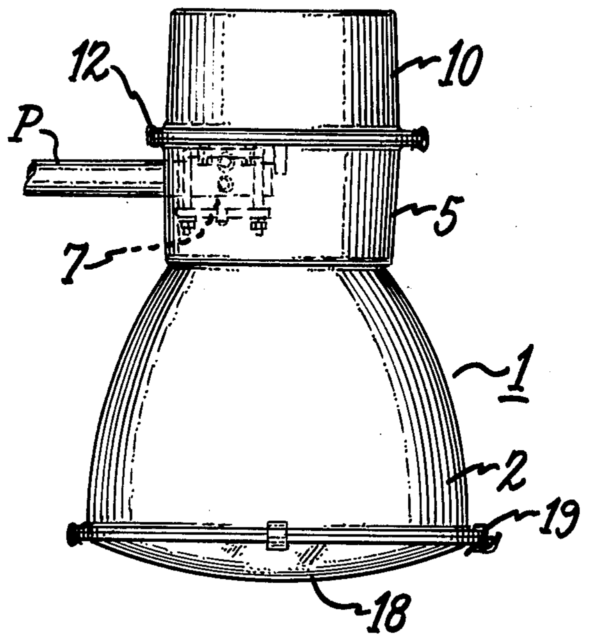
FIG. 1 is a side elevational view of a luminaire in which the invention may be embodied.
Figure 2:
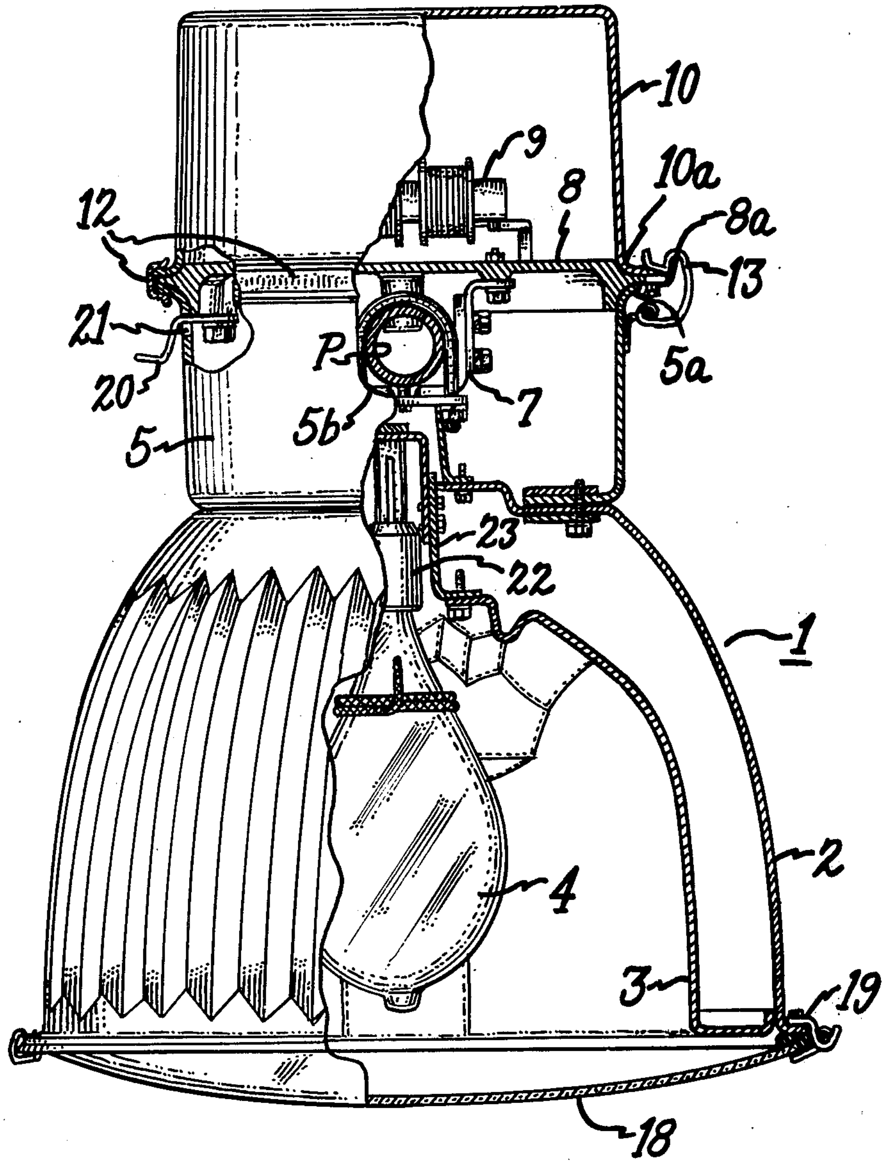
FIG. 2 is a rear elevational view in enlarged scale, partly in section, of the FIG. 1 luminaire.

Referring now to the drawings, and particularly to FIGS. 1 and 2, there is shown a luminaire of a type in which the slipfitter device of the invention may be embodied comprising an optical assembly 1 including dome-shaped reflector 2 and lamp 4 which is typically a high intensity gaseous discharge lamp. An auxiliary inner reflector 3 shown enclosed in main reflector 2 and employed for producing asymmetric distribution of reflected light may be dispensed with where such light distribution is unnecessary. The open bottom of main reflector 2 is closed by a light transmitting closure 18 which is secured to the rim of reflector 2 by clamp band 19 or other suitable means.

Secured at the top of optical assembly 1 by bolts 6 or the like is slipfitter housing 5 which is cylindrical in shape and has an open top defined by an outwardly flaring rim 5*a*. A U-shaped cutout 5*b* is provided in slipfitter housing 5 to allow passage of support pipe P on which the luminaire is mounted by means of adjustable slipfitter or pipe clamp 7, described more fully below.

Arranging covering the open top of slipfitter housing 5 is a circular disc-like mounting plate 8 seated on rim 5*a* with a correspondingly shaped lower mating surface on its periphery. Slipfitter 7 is secured to the underside of mounting plate 8, so as to be positioned within slipfitter housing 5.

Mounted on the upper side of mounting plate 8 are electrical operating components such as ballast transformer 9 for operating discharge lamp 4. Arranged on top of mounting plate 8 and enclosing the electrical components thereon is ballast housing 10 which is similar in shape to slipfitter housing 5 with a closed top and open bottom and has a flaring rim 10*a* at its bottom seated on the upper peripheral mating surface of mounting plate 8.

Embracing the annular joint thus formed by rims 5*a*, 10*a* and the intervening periphery of mounting plate 8 and locking the parts in assembly is clamp band fastener 12 which is formed of two sections respectively hinged on lug 8*a* projecting from mounting plate 8 and latched together at their free ends (not shown). At the hinged side of the clamp band 12 is arranged spring clamp 13 of generally U-shape hingedly secured to slipfitter housing 5 and resiliently bearing on the upper side of lug 8*a*.

Figure 3:
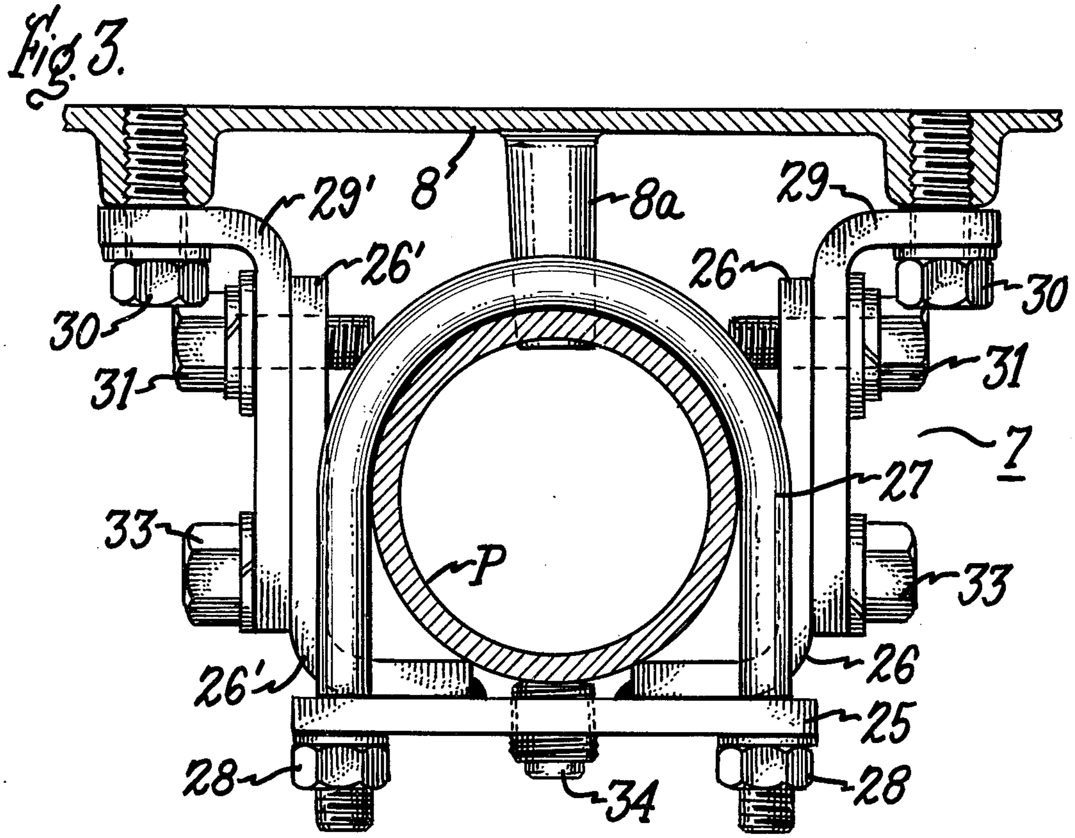
FIG. 3 is an elevational view in still further enlarged scale of the slipfitter device embodied in the FIG. 2 luminaire.
Figure 4:
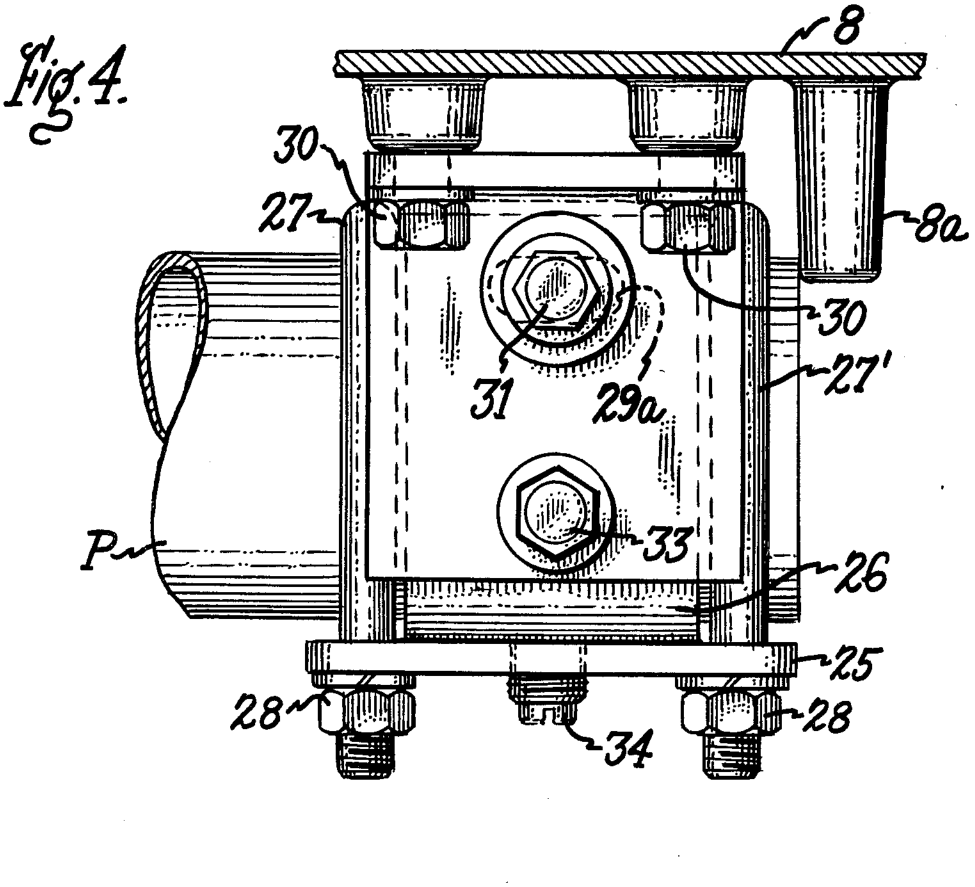
FIG. 4 is a similar view of the slipfitter device as viewed from the side thereof.

The slipfitter device of the present invention, as illustrated best in FIGS. 3 and 4, comprises a substantially square base plate 25 and a pair of L-shaped plate-like brace members 26, 26′ arranged in spaced relation with their shorter legs resting on and welded to the surface of base plate 25 and their longer legs projecting upwardly therefrom, as seen in FIG. 3. A pair of U-shaped clamping bolts 27, 27′ are mounted in spaced relation on base plate 25 with their free ends passing through holes in the base plate and threadably secured by nuts 28. Clamping bolts 27, 27′ thus define a fore-and-aft passage between brace members 26, 26′ for receiving pipe P along the axis of that passage.

A pair of plate-like L-shaped bracket members 29, 29′ are respectively adjustably secured at their longer legs to brace members 26, 26′ in overlapping relation thereto and connected at their shorter legs to the underside of mounting plate 8 by bolts 30, so as to suspend slipfitter 7 below mounting plate 8.

Figure 5:
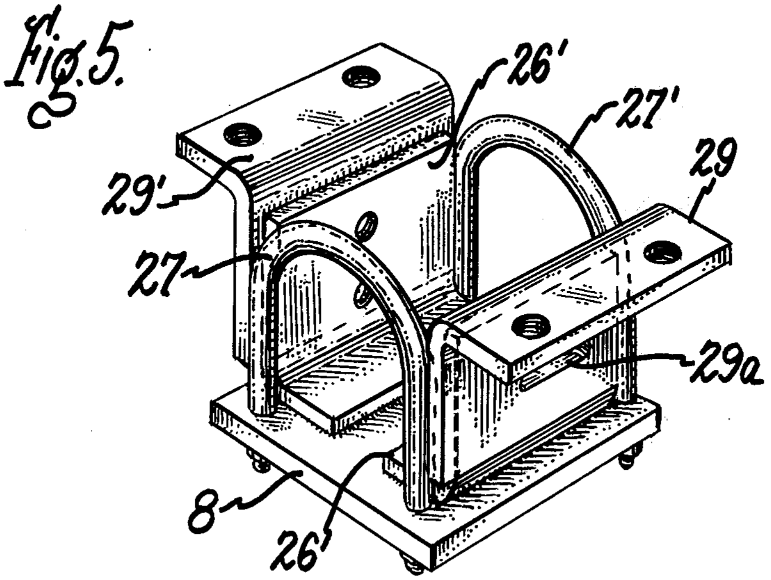
FIG. 5 is a view in perspective of the slipfitter device.

Bracket members 29, 29′ are each formed with a slot 29*a* (see FIGS. 4 and 5) through which bolt 31 freely passes for engagement with a threaded aperture in each brace member 26, 26′, with washer 32 arranged between the bolt head and the adjacent surface of the bracket member. Vertically aligned below each bolt 31 is bolt 33 which secures bracket members 29, 29′ to the respective juxtaposed brace members 26, 26′.

In the installation of the luminaire, the slipfitter is mounted on support pipe P with the latter inserted into the passage formed by spaced U-shaped clamps 27, 27′, the amount of insertion being limited by pipe stop 8*a* projecting downward from mounting plate 8 at the front end of the slipfitter passage. Tightening of nuts 28 clamps the U-bolts 27, 27′ against support pipe P which is thereby pressed at its lower side against the end edges of the spaced brace members 26, 26′, as seen in FIG. 3, thereby preventing slippage of the slipfitter around pipe P.

To further ensure against such slippage, set screw 34 having a pointed end is preferably threadably inserted in base plate 25 with its pointed end penetrating the surface of pipe P to hold the parts against relative rotation.

Side-to-side adjustment of the luminaire is achieved by loosening clamp bolts 27, 27' and set screw 34, and then rotating the unit about the axis of pipe P, i.e., about the longitudinal axis of the slipfitter, until the desired position is reached, after which clamp bolts 27, 27' and set screw 34 are tightened.

Front-to-rear adjustment of the luminaire is obtained by loosening bolts 31 and 33 on each bracket member 29, 29' and lifting or lowering the front of the luminaire to reach the desired position, after which bolts 31 and 33 on each side are tightened. During this adjustment, upper bolts 31 move in slots *29a* as the luminaire pivots about lower bolts 33, i.e., about a lateral axis normal to the longitudinal axis of the slipfitter.

The described arrangement thus makes it possible for the installer to separately make the desired adjustments about the two different axes.

The slipfitter structure described is relatively compact in size as compared to known types of luminaire slipfitters, and readily fits into the limited interior space of housing 5 while being fully enclosed therein.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Mounting device for a luminaire adapted to be mounted on an elongated support comprising, in combination, a support member, a pair of spaced bracket members secured to and projecting from said support member, a base member spaced from said support member, a pair of brace members secured to said base member and projecting therefrom toward said support member in juxtaposed relation respectively to said bracket members, and clamping means adjustably secured to said base member defining a passage between said brace members for receiving the elongated support along the axis of said passage and for clamping the same therein, said bracket members respectively being adjustably secured to said brace members for adjustment relative thereto about an axis transverse said first mentioned axis.

2. A device as defined in claim 1, said brace members and said bracket members comprising plate-like members, said bracket members being arranged in overlapping relation with the respective brace members.

3. Mounting device for a luminaire adapted to be mounted on an elongated support comprising, in combination, a support member, a pair of spaced bracket members secured to and projecting from said support member, a base member spaced from said support member, a pair of brace members secured to said base member and projecting therefrom toward said support member in juxtaposed relation respectively to said bracket members, and clamping means adjustably secured to said base member defining a passage between said brace members for receiving the elongated support along the axis of said passage and for clamping the same therein, said bracket members respectively being adjustably secured to said brace members for adjustment relative thereto about an axis transverse said first mentioned axis, said brace members and said bracket members comprising plate-like members, said bracket members being arranged in overlapping relation with the respective brace members, first connecting means securing each bracket member to the adjacent brace member along said transverse axis, each bracket member having a slot and being secured to the adjacent brace member by second fastening means passing through said slot, whereby said bracket member is adjustable to selected positions relative to said brace member about said first connecting means.

4. A device as defined in claim 3, said first and second connecting means being in vertically spaced alignment.

5. A device as defined in claim 2, said brace members being substantially L-shaped with leg portions thereof resting on said base member and having end edges facing each other in spaced relation on opposite sides of said first mentioned axis, whereby the support member may be clamped against said end edges of said brace members for holding the mounting device in tight engagement with the support member.

6. A device as defined in claim 2, said clamping means comprising a pair of U-bolts arranged spaced on said base member along said first mentioned axis.

7. A luminaire comprising, in combination, a support member, a first housing covering one side of said support member, a second housing covering the opposite side of said support member, and slipfitter means secured to said support member for mounting the luminaire on an elongated support, said slipfitter means comprising a pair of spaced bracket members secured to and projecting from said support member, a base member spaced from said support member, a pair of brace members secured to said base member and projecting therefrom toward said support member in juxtaposed relation respectively to said bracket members, and clamping means adjustably secured to said base member defining a passage between said brace members for receiving the elongated support along the axis of said passage and for clamping the same therein, said bracket members respectively being adjustably secured to said brace members for adjustment relative thereto about an axis transverse said first mentioned axis.

8. A luminaire as defined in claim 7, said slipfitter means extending into and being enclosed by said second housing, said luminaire including an optical assembly secured to said second housing.

9. A luminaire as defined in claim 8, said transverse axis extending in a direction normal to said first mentioned axis.

* * * * *